(12) United States Patent
Buisson et al.

(10) Patent No.: US 10,976,480 B2
(45) Date of Patent: Apr. 13, 2021

(54) SIGNALING LIGHT FOR A MOTOR VEHICLE, PROMOTING INCREASED LIGHT PROPAGATION IN A LIGHT GUIDE

(71) Applicant: MARELLI AUTOMOTIVE LIGHTING FRANCE, Saint-Julien-du-Sault (FR)

(72) Inventors: Alain Buisson, Le Mesnil-Saint-Denis (FR); Erwan Provot, Trappes (FR); Sean Patterson, Trappes (FR)

(73) Assignee: MARELLI AUTOMOTIVE LIGHTING FRANCE, Saint-Julien-du-Sault (FR)

( * ) Notice: Subject to any disclaimer, the term of this patent is extended or adjusted under 35 U.S.C. 154(b) by 0 days.

(21) Appl. No.: 16/613,320

(22) PCT Filed: May 15, 2018

(86) PCT No.: PCT/EP2018/062622
§ 371 (c)(1),
(2) Date: Nov. 13, 2019

(87) PCT Pub. No.: WO2018/210881
PCT Pub. Date: Nov. 22, 2018

(65) Prior Publication Data
US 2020/0096693 A1    Mar. 26, 2020

(30) Foreign Application Priority Data
May 15, 2017    (FR) ...................................... 17 54266

(51) Int. Cl.
*F21V 8/00*    (2006.01)
*F21S 43/50*    (2018.01)
(Continued)

(52) U.S. Cl.
CPC ............ *G02B 6/0031* (2013.01); *F21S 43/14* (2018.01); *F21S 43/239* (2018.01); *F21S 43/245* (2018.01);
(Continued)

(58) Field of Classification Search
CPC .. G02B 6/0036; G02B 6/0055; G02B 6/0031; F21S 43/14; F21S 43/239; F21S 42/245; F21S 43/50; F21S 43/51
See application file for complete search history.

(56) References Cited

U.S. PATENT DOCUMENTS 7,253,799 B2 * 8/2007 Lee ...................... G02B 6/0036
345/102
9,249,946 B2 * 2/2016 Mulet ............... B32B 17/10541
(Continued)

FOREIGN PATENT DOCUMENTS

EP    2541291 A1    1/2013
FR    3033191 A1    9/2016
(Continued)

OTHER PUBLICATIONS

International Search Report for PCT International Application No. PCT/EP2018/062622 dated Jul. 20, 2018.
(Continued)

*Primary Examiner* — Peggy A Neils
(74) *Attorney, Agent, or Firm* — Howard & Howard Attorneys PLLC

(57) ABSTRACT

The invention relates to a lighting device for a signal light of a motor vehicle, generating increased light propagation in a light guide. To this end, the lighting device comprises a light guide defined by a front face, a light source illuminating a first end of the light guide, and a first mask which is positioned in front of the light source and a part of the front face of the light guide, such that the first mask hides the light
(Continued)

source from an observer looking at the front face of the light guide. Advantageously, the front face of the light guide, facing the first mask, is at least partially covered by a separating layer reflecting the light emitted by the light source.

11 Claims, 4 Drawing Sheets

(51) Int. Cl.
    *F21S 43/14*     (2018.01)
    *F21S 43/239*     (2018.01)
    *F21S 43/245*     (2018.01)

(52) U.S. Cl.
    CPC ............ *F21S 43/51* (2018.01); *G02B 6/0036* (2013.01); *G02B 6/0055* (2013.01)

(56) References Cited

U.S. PATENT DOCUMENTS

| | | | |
|---|---|---|---|
| 10,105,933 B2* | 10/2018 | Berard | B32B 17/10761 |
| 10,293,761 B2* | 5/2019 | Topart | B60R 13/02 |
| 10,310,158 B2* | 6/2019 | Del Carmen Montano | B60Q 1/0011 |
| 2012/0327680 A1 | 12/2012 | Kropac et al. | |
| 2013/0003398 A1 | 1/2013 | Godbillon | |
| 2013/0322110 A1 | 12/2013 | Cantu et al. | |
| 2014/0104877 A1 | 4/2014 | An et al. | |
| 2014/0254186 A1* | 9/2014 | Terai | B60Q 1/24 362/487 |
| 2014/0319995 A1* | 10/2014 | Kim | G02B 6/0031 313/501 |
| 2014/0369067 A1* | 12/2014 | Chen | G02B 6/0031 362/606 |
| 2016/0252228 A1* | 9/2016 | Martinez | G02B 6/0043 362/511 |
| 2017/0219761 A1 | 8/2017 | Fukui et al. | |
| 2018/0252856 A1* | 9/2018 | Penkert | G02B 6/4248 |

FOREIGN PATENT DOCUMENTS

| | | |
|---|---|---|
| JP | 2001105966 A | 4/2001 |
| JP | 2004196201 A | 7/2004 |
| WO | 2017017869 A1 | 2/2017 |

OTHER PUBLICATIONS

Written Opinion of the International Searching Authority for PCT International Application No. PCT/EP2018/062622 dated Jul. 20, 2018.

* cited by examiner

SIGNALING LIGHT FOR A MOTOR VEHICLE, PROMOTING INCREASED LIGHT PROPAGATION IN A LIGHT GUIDE

CROSS-REFERENCE TO RELATED APPLICATIONS

The present application is a National Stage of International Patent Application No. PCT/EP2018/062622, filed on May 15, 2018, which claims priority to and all the benefits of French Patent Application No. 1754266, filed on May 15, 2017, both of which are hereby expressly incorporated herein by reference in their entirety.

BACKGROUND OF THE INVENTION

1. Field of the Invention

The present invention relates to the technical field of signal and/or signalling lighting for motor vehicles. It more particularly relates to a lighting device for a motor vehicle signalling light, comprising a substantially homogeneously lighted light guide.

2. Description of the Related Art

The regulation in force requires different lighting or signalling lights according to the type of motor vehicle. But, besides the volume of all the lights, the lighting performance and uniformity of the so-grouped individual lights are major concerns.

Lighting devices for lighting more or less uniformly a thin screen, to display a light signal indicating the positioning or a change of direction of a vehicle, are known from the prior art. FIG. 1 illustrates an example of this type of lighting device 1, comprising a light guide 4 delimited by a front face 6 parallel to a rear face 8. The front and rear faces are delimited by lateral faces 10 connecting said faces. The light guide 4 hence forms a substantially planar screen, extending in a longitudinal direction (AA'), between a first end 12 and a second end 14. The light guide 2 is transparent to allow the propagation of light beams 16, emitted by a light-emitting diode 18, between its first and second ends. More precisely, the light-emitting diode 18 is positioned at the first end 12 of the light guide to light the lateral face 10 thereof.

To provide an impression of substantially homogeneous lighting along the light guide 4, a mask 20 is positioned in front of the light-emitting diode 18 and against a part of the front face 6 of the light guide 4. The mask modifies locally the properties of reflection of the front face 6, favouring a decoupling and/or an absorption of the light beams 16A propagating in the light guide 4. That way, a part of the light beams 16A emitted by the light-emitting diode 18 is lost at the mask 20, which has for effect to reduce the intensity of the light signal propagating in the light guide 4.

The present invention has for object to solve this problem, by proposing a lighting device for a motor vehicle signalling light, comprising a light guide lighted substantially homogeneously along the guide, while favouring the propagation of a greater quantity of light in the guide.

SUMMARY OF THE INVENTION

In order to achieve this objective, the invention proposes a lighting device comprising a light guide delimited by a front face, a light source lighting a first end of the light guide as well as a first mask positioned in front of the light source and a part of the front face of the light guide, so that the first mask hides the light source to an observer looking at the front face of the light guide. In other words, in the present case, the observer faces the front face of the light guide.

In one embodiment, the front face of the light guide, opposite the first mask, is at least partially covered by an interlayer reflecting the light emitted by the light source.

The interlayer interposed between the light guide and the first mask allows reflecting the light emitted by the light source and hence limiting the phenomena of decoupling of the light that propagates in the light guide at the first mask. That way, the interlayer favours the propagation of a greater quantity of light in the guide. Preferably, the interlayer totally reflects the light emitted by the light source in order to optimize the quantity of light propagating in the light guide.

According to a first embodiment of the invention, the interlayer extends continuously along the front face, in a direction of propagation of the light emitted by the light source in the light guide, between the first end of the light guide hidden behind the first mask and an end of the first mask hiding a part of said front face.

According to another embodiment of the invention, the interlayer covers between 10% and 100%, preferably between 70% and 90%, of the front face of the light guide hidden behind the first mask.

According to another embodiment of the invention, the interlayer covers the end of the front face of the light guide hidden behind the first mask. The end of the front face corresponds to the first end of the light guide. In other words, the interlayer extends up to the edge of the lateral face delimiting the first end of the light guide.

According to another embodiment of the invention, the interlayer is set back from the end of the first mask that covers the front face of the light guide. This embodiment advantageously allows the interlayer not to be visible at the end of the first mask covering the front face of the light guide. According to another advantage, this also allows mitigating the impression of hot spot at an edge of the interlayer. By "hot spot", it is herein meant an area of the light guide that is more intensely lighted by the light source. The value of this setback is comprised between a few millimetres and a few tens of millimetres, preferably between 5 mm and 15 mm, or between 5 mm and 10 mm, preferably of the order of 6 mm.

According to another embodiment of the invention, the end of the first mask is curved towards the front face of the light guide, so as to fully hide the interlayer to an observer. Preferably, the end of the first mask is in contact with the front face of the light guide in order to form, in cooperation with said front face, a housing protecting the separating film from humidity and dust.

According to another embodiment of the invention, the thickness of the interlayer is lower than 5 mm, preferably lower than 1 mm.

According to another embodiment of the invention, the interlayer is in contact with the first mask. This embodiment advantageously allows minimizing the thickness of the lighting device.

According to another embodiment of the invention, the interlayer is formed from a metallic material of the aluminium, silver or chromium type.

According to another embodiment of the invention, the light guide is made from a material of transparent or translucent aspect, so as to favour a propagation of light through the whole light guide. By way of example, the light guide may be made from one of the following materials:

poly(methyl methacrylate) (PMMA) and/or polycarbonate (PC). Of course, these examples are not exhaustive.

According to another embodiment of the invention, the light source comprises at least one light-emitting diode. According to another embodiment, the light source includes several light-emitting diodes of different colours to display light information of different colours at the light guide. By way of example, the light source may be configured to light the light guide with an amber colour to signal a change of direction of a motor vehicle provided with a lighting device according to the invention and/or with a white colour to signal the moving back of said vehicle and/or with a red colour to signal the positioning and/or the braking thereof.

According to another embodiment of the invention, the lighting device includes another light source lighting another end of the light guide, preferably a second end of the light guide opposite the first end thereof. This embodiment advantageously allows lighting more homogeneously a light guide of greater size.

According to a preferred embodiment, the light guide includes, at a second end, a groove receiving a second mask so that the latter flushes with the front face of the light guide. The second mask allows limiting the impression of hot spot at the second end of the light guide. This embodiment also allows forming a plain surface at the front face of the light guide and of the second mask. This produces a more aesthetic effect. According to another advantage, the alignment between the front faces of the light guide and of the second mask forms a same face having no protrusion liable to retain the dirt. The lighting device is hence simpler to maintain. According to another advantage, the absence of protrusion at this same face limits the risk of injury in case of collision between a pedestrian and a motor vehicle provided with such a lighting device.

According to another embodiment of the invention, the front face of the light guide, opposite the second mask, is at least partially covered by another interlayer reflecting the light emitted by the other light source. The different variant embodiments mentioned hereinabove relating to the interlayer opposite the first mask are transposable to the other interlayer.

According to another embodiment of the invention, the light guide includes diffractors that act to diffract the light propagating in the light guide. The diffractors reflect the light in at least one direction substantially normal to the longitudinal axis (AA') of the light guide. The diffractors are in particular present in the portion of the light guide that it not covered by the first mask and/or the second mask, so that the light diffracted is more easily visible by an observer looking at the front face of the light guide.

According to a preferred embodiment, the first mask and/or the second mask covers one or several diffractors. This embodiment advantageously allows the observer to better perceive the light beyond the first mask or the second mask, when he/she inclines his/her viewing angle to observe behind said mask. By way of example, a first diffractor may be set back from the first mask and/or the second mask, by being positioned at a distance from one end of said mask covering the light guide comprised between 5 mm and 15 mm, preferably of the order of 10 mm. Of course, these values are adaptable as a function of the power of the light source, of the length of said mask and of the thickness of the light guide.

According to a preferred embodiment of the invention, the diffractors are defined by cavities provided in a rear face of the light guide, the rear face being opposed to the front face of the light guide. According to an alternative embodiment, the rear face is grained.

According to another embodiment of the invention, the light guide forms at least one concavity and/or one convexity, so as to form at its front face a three-dimensional surface. This embodiment allows a greater adaptability of the lighting device to the shape of an optical case and/or to the contours of the body of a motor vehicle provided with a lighting device according to the invention.

The different characteristics, variants and embodiments mentioned hereinabove may be associated with each other according to various combinations insofar as they are not incompatible or exclusive relative to each other.

The present application also relates to a method for manufacturing a lighting device as described hereinabove, implementing a step of overmoulding the interlayer on a part of the front face of the light guide, then a step of fixing the first mask on at least one part of the interlayer. By way of non-limitative example, the first mask may be stuck on the interlayer using known means. According to an alternative, a lighting device according to the invention is manufactured during a first step of applying the interlayer against a face of the first mask, then, using known means, the first mask is maintained opposite the front face of the light guide, so that the interlayer is in contact with said front face. According to a variant embodiment, a method for manufacturing a lighting device as described hereinabove implements a step of overmoulding the interlayer on a part of the front face of the light guide, so as to form the first mask. Advantageously, the above-mentioned overmoulding techniques allow protecting the interlayer from the outer environment, at the front face of the light guide.

The invention also relates to a signalling light or a side light for a motor vehicle, comprising a lighting device as described hereinabove. The light guide of the lighting device may form an intermediate screen of the signalling light.

Preferably, the light guide forms an outer screen of the signalling light. By "outer screen", it is meant the fact that the light guide closes a part of an optical case housing the lighting device, so as to protect from the outer environment the components present in the optical case. Advantageously, the light guide then simultaneously ensures the two following functions: protecting the components present in the optical case and displaying a light signal at the light guide, for warning an observer about the position and/or the change of direction of a motor vehicle provided with a signalling light according to the invention. It is therefore no longer necessary to use a specific protective screen, which advantageously allows doing without such a screen and reducing the depth of the signalling light but also reducing the weight of the signalling light. By "depth", it is meant a size of the signalling light in a direction substantially normal to the front face of the light guide. By way of example, the depth of a signalling light according to the invention may hence be equal to or lower than 50 mm or than 15 mm, preferably equal to or lower than 9 mm.

A shallow signalling light as proposed by the invention allows a better adaptability on a wider variety of bodies due to its lower bulk. As such, a signalling light according to the invention may be positioned on the front and/or on one side and/or on the rear of a motor vehicle. That way, the invention also relates to a motor vehicle comprising a signalling light as described hereinabove.

BRIEF DESCRIPTION OF THE DRAWINGS

The invention will be better understood, thanks to the following description, which relates to preferred embodiments, given by way of non-limitative examples, and explained with reference to the appended schematic drawings, in which.

DETAILED DESCRIPTION OF THE INVENTION

As a reminder, the invention proposes a lighting device for a motor vehicle signalling light, comprising a light guide lighted substantially homogeneously along the guide, while favouring the propagation of a greater quantity of light in the guide.

Figure 1:
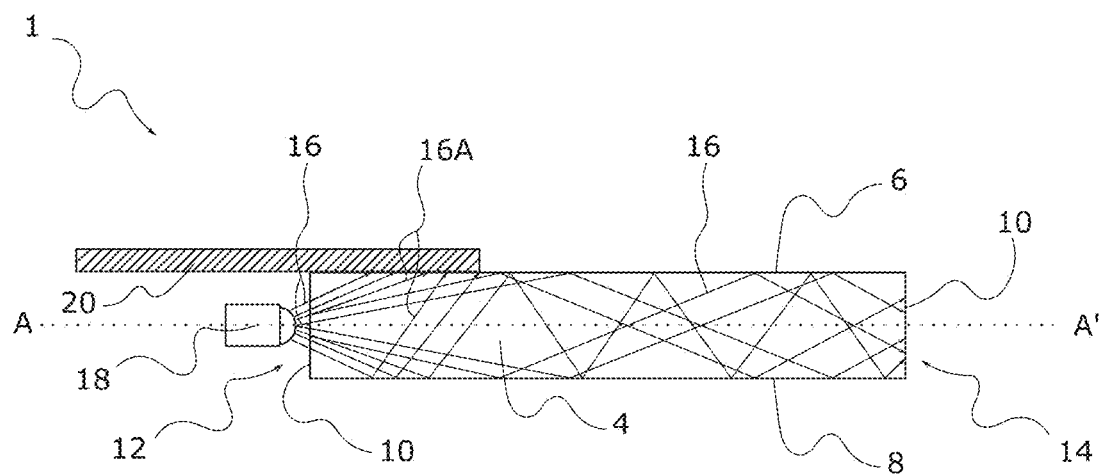
FIG. 1 is a schematic longitudinal cross-sectional view of a lighting device according to the state of the art.
Figure 2:
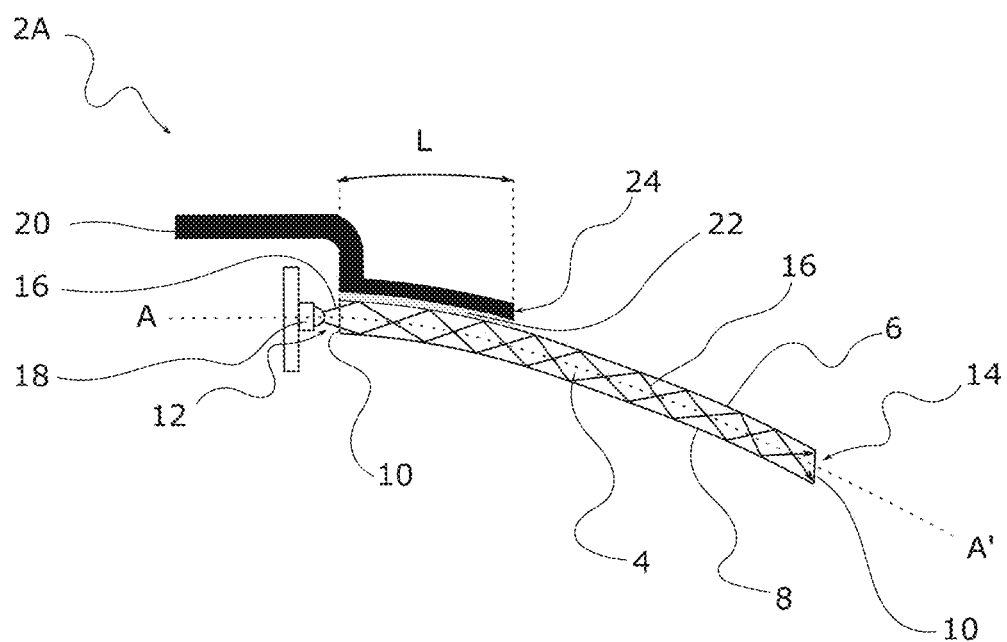
FIG. 2 is a schematic longitudinal cross-sectional view of a first embodiment of a lighting device according to the invention.

According to a first embodiment illustrated in FIG. 2, a lighting device 2A according to the invention is distinct from the lighting device 1 described hereinabove in that the light guide 4 is substantially convex at its front face 6 and in that it comprises an interlayer 22 interposed between the front face 6 and the first mask 20. It is to be noted that the identical elements between these two lighting devices 1 and 2A are indexed by the same numerical references.

More precisely, the interlayer 22 is in contact with the front face 6 of the light guide and the first mask 20. The interlayer 22 is at least partially reflective, preferably totally reflective, to the light beam 16 emitted by the light-emitting diode 18. Hence, advantageously, a greater quantity of light emitted by the light-emitting diode 18 propagates in the light guide 4. That way, the light guide 4 is perceived as brighter by an observer looking at the front face 6 of the light guide, in comparison with the light guide 1 described hereinabove.

By way of non-limitative example, the interlayer 22 is made from aluminium. The interlayer 22 extends from the first end 12 of the light guide 4, hidden by the first mask 20, up to an end 24 of the first mask hiding a part of the front face 6 of the light guide 4. In other words, the interlayer 22 extends over 100% or all the length L of the first mask 20 that hides the front face 6 of the light guide 4.

Preferably, the interlayer 22 is the thinnest possible in order to optimize the total thickness of the lighting device 2A. Of course, the interlayer is also thick enough to reflect most of the light beams 16 propagating in the light guide 4. For example, as a function of the nature of the interlayer, the thickness thereof is comprised between 0.1 mm and 2 mm, preferably of the order of 1 mm.

According to the present example, the light guide 4 comprises an inflexion point so as to form a three-dimensional wall whose thickness, defined as the distance separating its front face 6 from its rear face 8, is comprised between 1 mm and 50 mm, preferably of the order of 25 mm. Of course, according to other embodiments not shown, the light guide may be concave and/or convex.

The light guide 4 is transparent in order to allow the propagation of the light beams 16 along said guide. Preferably, the measured "HAZE" value at the front face of the light guide is comprised between 60% and 98%, preferably higher than 70%. By way of non-limitative example, the light guide 4 is formed from a poly(methyl methacrylate) (PMMA) and/or a polycarbonate (PC).

The first mask 20 is also made from one of the materials mentioned hereinabove and processed so as to be opaque to the light beams 16. In practice, the light guide 4 may have a length, defined along the axis (AA'), of about 200 mm to 300 mm when lighted by a light-emitting diode at its first end 12, and even up to 600 mm when another light-emitting diode lights its second end 14 (not shown in the Figures).

Figure 3:
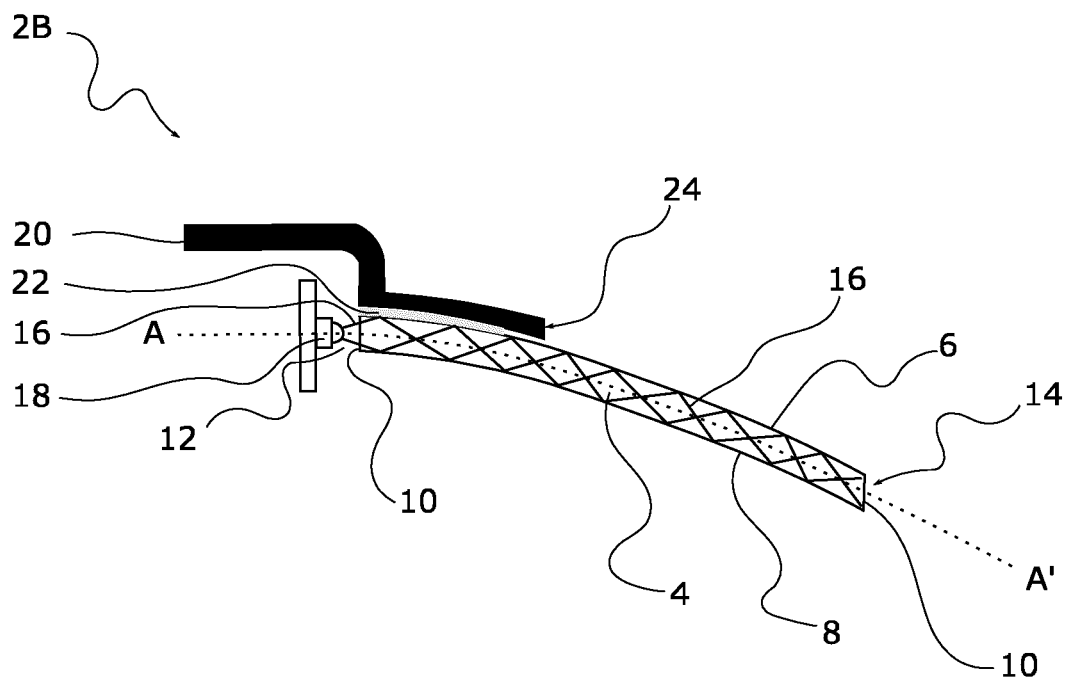
FIG. 3 is a schematic longitudinal cross-sectional view of a second embodiment of a lighting device according to the invention.

FIG. 3 now illustrates a second embodiment of a lighting device 2B according to the invention. This embodiment is distinct from the example described hereinabove in that the interlayer 22 is set back from the end 24 of the first mask 20, so that it is difficult for an observer facing the front face 6 to observe the interlayer 22. Preferably, the end 24 of the first mask 20 protrudes from the interlayer film 22 by a length adapted to reduce the impression of hot point observable at the edge of the interlayer 22. By "hot spot", it is meant herein an area of the light guide 4 that is locally more lighted at its front face 6 by the light source 18. According to the present example, the end 24 of the first mask protrudes from the interlayer by a length comprised between 5 mm and 15 mm, preferably of the order of 10 mm. Of course, this value is liable to change as a function of the thickness of the interlayer and of the power of the light source.

Figure 4:
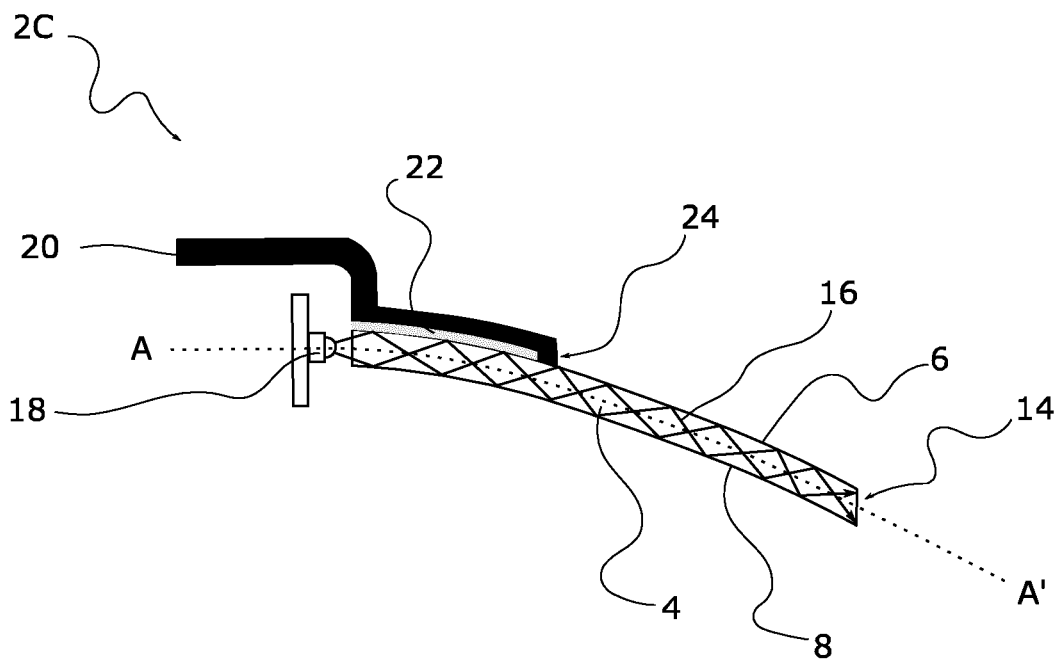
FIG. 4 is a schematic longitudinal cross-sectional view of a third embodiment of a lighting device according to the invention.

FIG. 4 illustrates a third embodiment of a lighting device 2C according to the invention. This embodiment is distinct from the example described hereinabove in that the end 24 of the first mask 20 covers a part of the front face 6 of the light guide 4, so as to fully hide the interlayer 22 to an observer facing the front face 6. Preferably, the end 24 is in direct contact with the front face 6 of the light guide 4, so that the first mask 20 and the light guide form a housing protecting the interlayer film 22, in particular from humidity and dust. According to a preferred embodiment, the end 24 of the first mask 20 extends over a length comprised between 5 mm and 6 mm on the front face 6, in order to reduce the hot spot impression described hereinabove.

Figure 5:
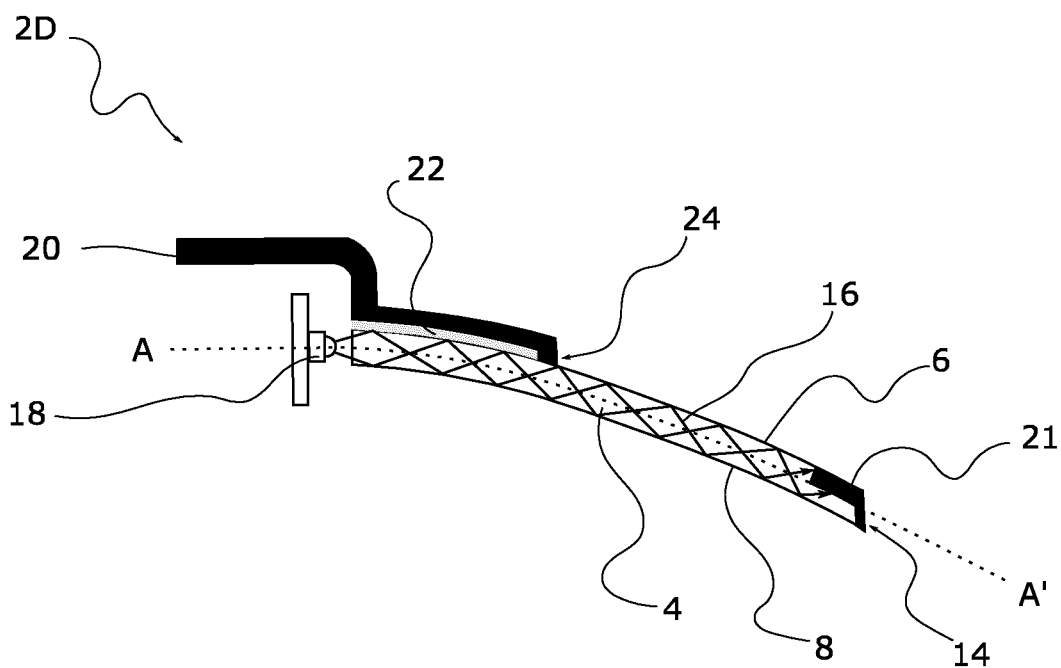
FIG. 5 is a schematic longitudinal cross-sectional view of a fourth embodiment of a lighting device according to the invention.

FIG. 5 illustrates a fourth embodiment of a lighting device 2D according to the invention. This fourth example is distinct from the previous example in that the light guide 4 includes a groove opening both into a part of the lateral face 10 delimiting its second end 14 and into a part of its front face 6. The groove receives a second mask 21 flushing with the front face 6. Like the first mask 20, the presence of the second mask 21 aims to attenuate the hot spot feeling at the end of the light guide. Preferably, this second mask is moulded into said groove. Preferably, the first and the second mask are moulded at the same time on the light guide 4.

Figure 6:
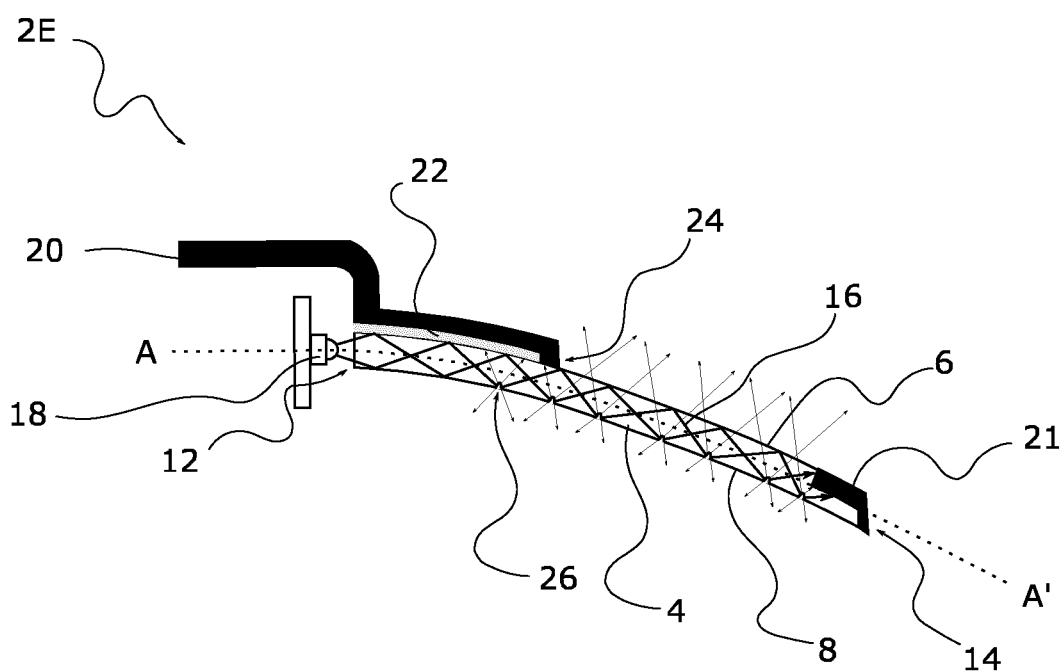
FIG. 6 is a schematic longitudinal cross-sectional view of a fifth embodiment of a lighting device according to the invention.

FIG. 6 illustrates a fifth embodiment of a lighting device 2E according to the invention, in which the light guide 4 includes conical cavities 26 at its rear face 8. Each cavity 26 acts to scatter a part of the light beams 16 propagating between the first end 12 and the second end 14 of the light guide 4, in order to uniformize the light output of the light guide for an observer and to also eliminate the scattering irregularities.

Preferably, a few cavities 26 are provided opposite the first mask 20 in order to preserve an optimum propagation of the light beams 16 in the light guide 4 at the first mask 20, while allowing an observer to better perceive the light beyond the first mask when he/she inclines his/her viewing angle to observe behind said mask. Preferably, the smallest distance separating a cavity 26 from the first end 12 of the light guide is comprised between 5 mm and 20 mm, preferably of the order of 10 mm. Of course, like the first mask 20, the second mask 21 may also cover a few cavities 26 for the same reasons.

Figure 7:
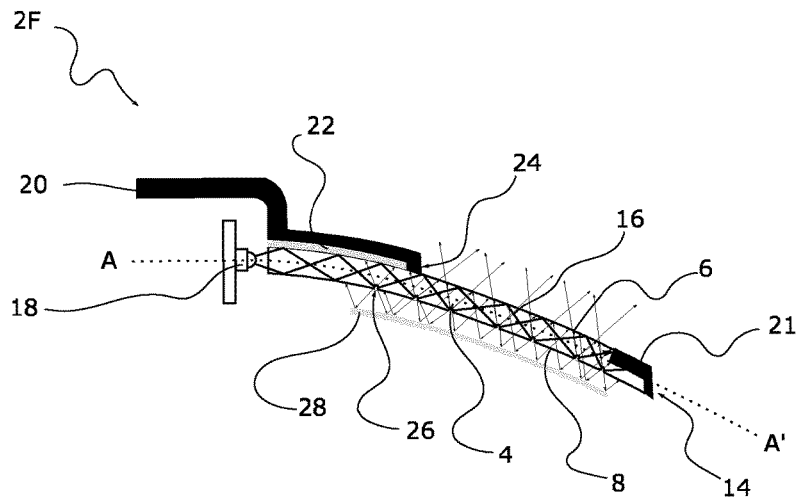
FIG. 7 is a schematic longitudinal cross-sectional view of a sixth embodiment of a lighting device according to the invention.

FIG. 7 illustrates a sixth embodiment of a lighting device 2F according to the invention. This new embodiment is distinct from the fifth one in that the lighting device 2F now includes a plate 28 covered with a reflective layer. The reflective layer is placed opposite the front face 6 of the light guide 4. More precisely, the reflective layer reflects the light scattered by the light guide 4, towards the front face 6 thereof. By way of non-limitative example, the reflective layer covering the plate 28 may be of same nature as the interlayer 22, i.e. with a smooth and metallized surface. This advantageously allows giving a dynamic effect to the cavities 26, by creating as an optical effect for an observer of the front face 6 of the light guide 4 that the cavities 26 move when the observer changes his/her angle of observation of said front face 6. Conversely, the reflective layer covering the plate 28 may have a grained surface, in order to uniformize the light reflecting on it and hence to accentuate the impression of a homogeneous light strip emitted by the light guide 4.

According to a variant embodiment, the light guide 4 is colourless and the reflective layer covering the plate 28 is bright to favour the reflection of a greater quantity of light. According to a preferred embodiment, the reflective layer has a colour similar to that of the body of a motor vehicle provided with a lighting device according to the invention. Hence, in the absence of emission of a light signal by the light source, the light guide allows the outer light to reflect on the reflective layer to give an impression of homogeneity of the body. This embodiment hence offers a more aesthetic integration of the lighting device on the body.

According to another variant embodiment of the invention, not shown, the light source is controlled by a lighting device allowing progressively varying the intensity and/or the colour of the light emitted by said source, so as to create an effect of progressive lighting of the light guide 4.

Figure 8:
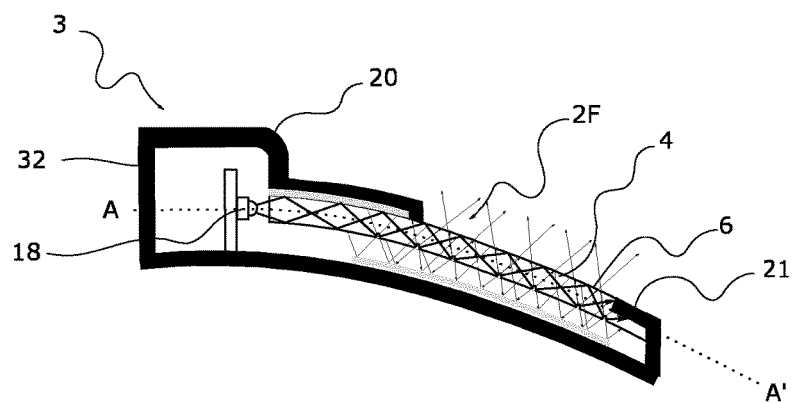
FIG. 8 is a schematic longitudinal cross-sectional view of a signalling light comprising a lighting device according to FIG. 7.
Figure 9:
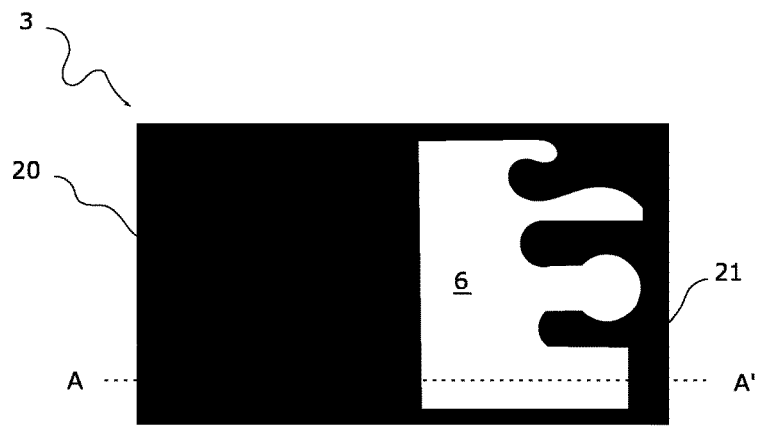
FIG. 9 is a front view of the front face of a signalling light according to FIG. 8.

The lighting devices described hereinabove are preferably intended to equip a signalling light or a side light for a motor vehicle, for example an additional element of the signalling and/or positioning light. By way of example, the sixth embodiment described hereinabove may be integrated in an optical case 32 to form a signalling light 3 illustrated in FIGS. 8 and 9. Advantageously, the light guide 4 forms an outer screen of the signalling light 3. The light guide then simultaneously ensures the two following functions: protecting the components present in the optical case 32 and displaying a light signal at the light guide, for warning an observer about the position and/or of the change of direction of a motor vehicle provided with a signalling light according to the invention. It is therefore no longer necessary to use a specific protective screen, which advantageously allows doing without such a screen and reducing the depth and the weight of the signalling light. By way of example, the depth of a signalling light according to the invention may hence be equal to or lower than 50 mm or than 15 mm, preferably equal to or lower than 9 mm. A shallow signalling light as proposed by the invention allows a better adaptability on a wider variety of bodies due to its lower bulk. According to another advantage, the first mask 20 and the second mask 21 form a frame as illustrated in FIG. 9, preferably overmoulded on the front face 6 of the light guide, so as to delimit a window whose contours may be of varied shapes in order to personalize the light strip emitted by the lighting device according to the invention.

As mentioned hereinabove, the invention also relates to a method for manufacturing a lighting device as described hereinabove. According to a non-limitative example, the manufacturing method implements a first step of moulding the light guide 4, in a mould designed for that purpose, by a technique of hot injection of plastic material. The plastic material used is, for example, poly(methyl methacrylate) (PMMA) and/or a polycarbonate (PC). As illustrated in FIG. 4, the light guide is delimited at its larger faces by a front face 6 opposite to a rear face 8. According to the present example, the surface delimited by the front face 6 is comprised between a few cm$^2$ and a few m$^2$. The thickness of the light guide 4 is comprised in the ranges of values mentioned hereinabove. The light guide 4 is manufactured so as to form a three-dimensional wall, able to serve as an outer screen for an optical case.

Then, during a second step, an interlayer 22 as described hereinabove is applied against a part of the front face 6 of the light guide 4, located at the first end 12 thereof. This second step is performed after the light guide 4 has been cooled down enough, so that the temperature of its front face 6 is lower than 80° C., preferably lower than 60° C. The risks of deformation or degradation of the interlayer are hence limited. The thickness of the interlayer 22 is comprised in the range of values mentioned hereinabove.

During a third and last step, the interlayer 22 is overmoulded to form the first mask 20 according to the invention, by injection of a plastic material compatible with that used to form the light guide 4. By "compatible", it is meant the use of a plastic material forming an adherent and seal layer on the light guide. More precisely, the plastic material is spread against the interlayer 22 and a part of the front face 6 of the light guide 4 as illustrated by FIG. 4, so as to encapsulate the interlayer 22 between the light guide 4 and the first mask 20.

Hence, advantageously, the interlayer 22 is protected from the outer environment. The lighting device 2C may then be used as an outer screen for a motor vehicle signalling light. The signalling light then has a far lower thickness with respect to the state of the art, because it is no longer required to place a specific protective screen in front of the lighting device to protect it from the outer environment.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

The invention claimed is:

1. A signalling light for a motor vehicle comprising a lighting device comprising a light guide delimited by a front face, a light source lighting a first end of the light guide as well as a first mask positioned in front of the light source and a part of the front face of the light guide, so that the first mask hides the light source to an observer looking at the front face of the light guide, the front face of the light guide, opposite the first mask, being at least partially covered by an interlayer reflecting the light emitted by the light source, wherein the interlayer is set back from the end of the first mask that covers the front face of the light guide, wherein the light guide forms an outer screen of the signalling light.

2. The signalling light for a motor vehicle comprising a lighting device as set forth in claim 1, wherein the interlayer extends continuously along the front face, in a direction of propagation of the light emitted by the light source in the light guide, between the first end of the light guide hidden behind the first mask and an end of the first mask hiding a part of said front face.

3. The signalling light for a motor vehicle comprising a lighting device as set forth in claim 1, wherein the interlayer covers between 10% and 100% of the front face of the light guide hidden behind the first mask.

4. The signalling light for a motor vehicle comprising a lighting device as set forth in claim 1, wherein the interlayer covers the end of the front face of the light guide hidden behind the first mask.

5. The signalling light for a motor vehicle comprising a lighting device as set forth in claim 4, wherein the end of the first mask is curved towards the front face of the light guide, so as to fully hide the interlayer to an observer.

6. The signalling light for a motor vehicle comprising a lighting device as set forth in claim 1, wherein the thickness of the interlayer is lower than 5 mm, preferably lower than 1 mm.

7. The signalling light for a motor vehicle comprising a lighting device as set forth in claim 1, wherein the interlayer is in contact with the first mask.

8. The signalling light for a motor vehicle comprising a lighting device as set forth in claim 1, wherein the light guide comprises diffractors that act to diffract the light propagating in the light guide.

9. The signalling light for a motor vehicle comprising a lighting device as set forth in claim 8, wherein the first mask covers one or several diffractors.

10. The signalling light for a motor vehicle comprising a lighting device as set forth in claim 1, wherein the light guide includes, at a second end, a groove receiving a second mask so that the latter flushes with the front face of the light guide.

11. A method for manufacturing a signalling light for a motor vehicle comprising a lighting device as set forth in claim 1, implementing a step of overmoulding the interlayer arranged on a part of the front face of the light guide, so as to form the first mask.

* * * * *